United States Patent [19]

Plank et al.

[11] Patent Number: 5,102,644

[45] Date of Patent: * Apr. 7, 1992

[54] METHOD FOR PRODUCING ZEOLITES

[75] Inventors: Charles J. Plank, Woodbury; Edward J. Rosinski, Pedricktown, both of N.J.; Mae K. Rubin, Bala Cynwyd, Pa.

[73] Assignee: Mobil Oil Corporation, Fairfax, Va.

[*] Notice: The portion of the term of this patent subsequent to Jul. 27, 1999 has been disclaimed.

[21] Appl. No.: 701,314

[22] Filed: Feb. 13, 1985

Related U.S. Application Data

[60] Continuation of Ser. No. 357,956, Mar. 15, 1982, abandoned, and a continuation-in-part of Ser. No. 317,735, Nov. 3, 1981, Pat. No. 4,994,251, said Ser. No. 357,956, is a continuation of Ser. No. 23,117, Mar. 23, 1979, abandoned, said Ser. No. 317,735, is a continuation-in-part of Ser. No. 169,005, Jul. 15, 1980, Pat. No. 4,341,748, which is a division of Ser. No. 23,117, Mar. 23, 1979, abandoned, which is a continuation-in-part of Ser. No. 841,622, Oct. 13, 1977, Pat. No. 4,175,114, which is a continuation-in-part of Ser. No. 650,481, Jan. 19, 1976, abandoned, which is a continuation-in-part of Ser. No. 424,481, Dec. 13, 1973, abandoned.

[51] Int. Cl.⁵ .............................................. C01B 33/34
[52] U.S. Cl. ...................................... 423/328; 423/329; 502/64; 502/77
[58] Field of Search .......................... 502/60, 77, 64; 423/328, 329

[56] References Cited

U.S. PATENT DOCUMENTS

| | | | |
|---|---|---|---|
| 3,119,659 | 1/1964 | Taggart et al. | 23/112 |
| 3,321,272 | 5/1967 | Kerr | 23/113 |
| 3,516,786 | 6/1970 | Maher et al. | 23/113 |
| 3,532,459 | 10/1970 | McEvoy et al. | 23/112 |
| 3,671,191 | 6/1972 | Maher et al. | 23/113 |
| 3,702,886 | 11/1972 | Argauer et al. | 423/328 |
| 3,709,979 | 1/1973 | Chu | 423/328 |
| 4,061,724 | 12/1977 | Grose et al. | 423/335 |
| 4,175,114 | 11/1979 | Plank et al. | 423/329 |
| 4,257,885 | 3/1981 | Grose et al. | 210/691 |
| 4,269,813 | 5/1981 | Klotz | 423/277 |
| 4,341,748 | 7/1982 | Plank et al. | 423/328 |

FOREIGN PATENT DOCUMENTS 2704039  1/1977  Fed. Rep. of Germany .
1553209  9/1979  United Kingdom .

Primary Examiner—R. Bruce Breneman
Attorney, Agent, or Firm—Alexander J. McKillop; Charles J. Speciale; Malcolm D. Keen

[57] ABSTRACT

A method of producing zeolites particularly ZSM-5 and ZSM-11 by strictly controlling the composition of the forming bath such that no organic is required. In a preferred embodiment the forming bath can contain seeds, lower aliphatic alcohols and/or ammonium hydroxide. The as-crystallized product has no organic in its pore structures and has a relatively low silica to alumina ratio.

4 Claims, No Drawings

METHOD FOR PRODUCING ZEOLITES

This application is a continuation of application Ser. No. 357,956, filed Mar. 15, 1982, now abandoned and a continuation-in-part of application Ser. No. 317,735 filed Nov. 3, 1981, now U.S. Pat. No. 4,994,251. Application Ser. No. 357,956 is a continuation of application Ser. No. 023,117, filed Mar. 23, 1979 and now abandoned. Application Ser. No. 317,735 is a continuation-in-part of application Ser. No. 169,005, filed July 15, 1980, now U.S. Pat. No. 4,341,748 which application, in turn, was a division of application Ser. No. 023,117, filed Mar. 23, 1979, now abandoned. Application Ser. No. 023,117 was a continuation-in-part of application Ser. No. 841,622, filed Oct. 13, 1977, now U.S. Pat. No. 4,175,114 and, in turn, application Ser. No. 841,622 was a continuation-in-part of application Ser. No. 650,481, filed Jan. 19, 1976 and now abandoned and this application was, in turn, a continuation-in-part of application Ser. No. 424,481, filed Dec. 13, 1973, now abandoned.

FIELD OF THE INVENTION

This invention is related to a novel process of making porous crystalline siliceous solids having the topology represented by x-ray diffraction patterns whose four (4) strongest lines are $11.1 \pm 0.2$, $10.0 \pm 0.2$, $3.85 \pm 0.07$ and $3.71 \pm 0.05$. It also is directed to the novel products of this process. Exemplary of porous crystalline siliceous solids which are within the scope of this invention are those zeolites which have been identified as ZSM-5 type as illustrated by ZSM-5 and ZSM-11.

PRIOR ART

Porous crystalline solids having topology represented by an x-ray diffraction pattern having the above identified four (4) strongest lines are well known. U.S. Pat. Nos. 3,702,886 and 3,709,979 fully disclose materials, named as ZSM-5 and ZSM-11 respectively, as well as described effective means of making materials of this topology. U.S. Pat. No. 3,702,886 exemplified the production of ZSM-5 structured solids through the use of an organic tetraalkyl ammonium compound, such as a $C_2-C_5$ tetraalkyl ammonium compound, such as a $C_2-C_5$ tetraalkyl ammonium hydroxide, and U.S. Pat. No. 3,709,979 exemplified the production of ZSM-11 structured solids through the use of organic phosphonium compounds. Both of the prior art patents are incorporated herein in their entirety.

In addition, U.S. Pat. No. 3,671,191 teaches a general seeding technique, as does an article by Zhdanov, "Molecular Sieve Zeolites-I" ACS, 1971, pages 36 and 37. German Patent No. 2,212,810 discloses the use of a mixture of ethyl alcohol, ammonium hydroxide and triethylamine to make a porous crystalline material designated ZSM-8 and of a mixture of ammonia, propyl alcohol and tripropylamine to make ZSM-5.

SUMMARY OF THE INVENTION

This invention provides a novel process for producing synthetic porous siliceous crystals having a topology corresponding to an x-ray diffraction pattern having as its four (4) strongest lines $11.1 \pm 0.2$, $10.0 \pm 0.2$, $3.85 \pm 0.07$, and $3.71 \pm 0.05$. In its most generic form, this process is distinct from the prior art in not requiring the presence of organic nitrogen or organic phosphorus compounds in the crystallization both during the production of crystals as described herein.

DESCRIPTION OF SPECIFIC EMBODIMENTS

According to this invention, the presence of organic nitrogen or phosphorus, respectively, compounds is not required to produce crystals of ZSM-5 type topology. One method of avoiding these organic materials is to use seeds of the crystal structure desired together with an otherwise appropriately proportioned reaction mixture. Similarly, lower aliphatic alcohol can be used in place of the organic nitrogen or phosphorus compound as can inorganic ammonium hydroxide. It should be understood that any of these three alternative subgenera can be used in combination with each other.

According to this invention, the necessity of providing nitrogen or phosphorus organic compounds in the crystallization mixture is avoided if the mixture composition is carefully controlled to provide the following ratios:

|  | Broad | Preferred |
|---|---|---|
| $Na_2O/SiO_2$ | 0.05–0.7 | 0.05–0.4 |
| $SiO_2/Al_2O_3$ | 10–150 | 30–50 |
| $H_2O/Na_2O$ | 50–800 | 100–600 |

Although not necessarily essential to the practice of this invention, the production of the described porous siliceous crystals from a crystallization mixture free from nitrogen or phosphorus containing organic compounds can be facilitated by carrying out the crystallization in the presence of a member selected from the group consisting of ZSM-5 seeds, ZSM-11 seeds, mixtures thereof and/or in combination with $NH_4OH$ and/or alcohol and/or alcohol alone or in combination with ammonium hydroxide. It is to be understood that when seeds are used, ZSM-5 seeds produce ZSM-5 and ZSM-11 seeds produce ZSM-11. This is true whether they are used alone or in a mixture as set forth. It will also be understood that the preferred crystallization mixture ingredients included are: (1) ZSM-5 or ZSM-11 seeds; (2) ZSM-5 or ZSM-11 seeds plus alcohol; (3) ZSM-5 or ZSM-11 seeds plus $NH_4OH$; (4) ZSM-5 or ZSM-11 seeds plus alcohol plus $NH_4OH$; (5) alcohol; and (6) alcohol plus $NH_4OH$.

The aliphatic alcohol preferably is an alcohol containing 2 to 5 carbon atoms. Illustrative are ethanol, propanol, butanol and pentanol. It is contemplated that the alcohols may be straight or branch chain. It is preferred that the alcohol not include one having a quaternary carbon atom such as t-butanol.

ZSM-5 and ZSM-11 seeds may be from previously prepared batches of ZSM-5 and ZSM-11 made by previously described methods. Alternatively, seeds of ZSM-5 or ZSM-11 prepared by the process of this invention may be used. Furthermore, it has been discovered that when subsequent batches of ZSM-5 or ZSM-11 zeolites are made in the same equipment, the residual zeolite is in many cases sufficient to supply the requisite amount of seeds. It is believed that vessels in which ZSM-5 and/or ZSM-11, or other siliceous crystals, are made retain sufficient vestiges of the thus formed crystals to seed following made batches in the same vessel. It has been found that even such vessels which have been apparently rigorously cleaned still retain the ability to foster this crystallization from subsequent batches. In fact, if the crystallization mixture composition and conditions are carefully controlled as set forth herein, the crystallization takes place in the absence of phosphorus or nitrogenous organics even in new, previously unused vessels.

Only a small amount of seeds are needed for the practice of this invention. Generally, from about 0.01% by weight to about 10% by weight of final product is sufficient. It is preferred, however, to use from about 1% by weight to 6% by weight.

Siliceous crystals produced according to this invention are exemplified by the calcined product derived from the material having the x-ray diffraction pattern set forth in Table 1 of U.S. Pat. No. 3,702,886. Such crystals are known to be prepared by the procedure set forth in such patent, vis: preparing a solution containing water, tetrapropyl ammonium hydroxide and the elements of sodium oxide, an oxide of aluminum and an oxide of silica, and having a composition, in terms of mole ratios of oxides, falling within the following ranges:

TABLE A

|  | Broad | Preferred | Particularly Preferred |
|---|---|---|---|
| $\dfrac{OH^-}{SiO_2}$ | 0.07–1.0 | 0.1–0.8 | 0.2–0.75 |
| $\dfrac{R_4N^+}{(R_4N^+ + Na^+)}$ | 0.2–0.95 | 0.3–0.9 | 0.4–0.9 |
| $\dfrac{H_2O}{OH^-}$ | 10–300 | 10–300 | 10–300 |
| $\dfrac{YO_2}{W_2O_3}$ | 5–100 | 10–60 | 10–40 |

The solution is maintained at reaction conditions until the crystals are formed. Thereafter the crystals are separated from the liquid and recovered. Typical reaction conditions consist of a temperature of from about 75° C. to 175° C., for a period of about six hours to 60 days. A more preferred temperature range is from about 90° to 150° C., with the amount of time at a temperature in such range being from about 12 hours to 20 days.

Similarly, the crystals produced according to this invention are exemplified by the calcined product derived from the material having the x-ray diffraction pattern set forth in table 3 of U.S. Pat. No. 3,709,979. Such crystals are known to be prepared by the procedure set forth in such patent, vis: preparing a solution (R₄X)₂O, sodium oxide, an oxide of aluminum or gallium, an oxide of silicon or germanium and water and having a composition, in terms of mole ratios of oxides, falling within the following ranges:

TABLE B

|  | Broad | Preferred |
|---|---|---|
| $\dfrac{YO_2}{W_2O_3}$ | 10–150 | 20–90 |
| $\dfrac{Na_2O}{YO_2}$ | 0.05–0.70 | 0.05–0.40 |
| $\dfrac{(R_4X)_2O}{YO_2}$ | 0.02–0.20 | 0.02–0.15 |
| $\dfrac{H_2O}{Na_2O}$ | 50–800 | 100–600 | wherein $R_4X$ is a cation of a quarternary compound of an element of Group 5A of the Periodic Table, W is aluminum or gallium and Y is silicon or germanium maintaining the mixture until crystals of the zeolite are formed. Preferably, crystallization is performed under pressure in a stirred autoclave or static bomb reactor. The temperature ranges from 100° C. to 200° C. generally, but at lower temperatures, e.g., about 100° C., crystallization time is longer. Thereafter the crystals are separated from the liquid and recovered. The new zeolite is preferably formed in an aluminosilicate form.

For complete details of the preparation of ZSM-11, U.S. Pat. No. 3,709,979 is incorporated herein by reference.

In their preferred form, the porous siliceous crystals of this invention have, as produced in the presence of aluminum in the crystallization mixture, silica to alumina ratios from about 10 to about 200 when no seeds are used, and up to about 350 when seeds are used.

Crystals of this invention having the topology of ZSM-5 are preferably formed as the aluminosilicate, and can be prepared utilizing materials which supply the elements of the appropriate oxide. Such materials include aluminum sulfate, a mineral acid such as sulfuric acid, sodium aluminate, alumina, sodium silicate, silica hydrosol, silica gel, silicic acid, sodium hydroxide, along with the reagents of the improved method of this invention. It will be understood that each oxide component utilized in the reaction mixture can be supplied by one or more initial reactants, and they can be mixed together in any order. For example, sodium oxide can be supplied by an aqueous solution of sodium silicate. To make the crystals of the present invention, a solution similar to that mentioned for Table A, but having a composition comprising materials having the following mole ratios of oxides may be used:

TABLE C-1

|  | Broad | Preferred | Particularly Preferred |
|---|---|---|---|
| $\dfrac{OH^-}{SiO_2}$ | 0.07–1.0 | 0.1–0.8 | 0.2–0.75 |
| $\dfrac{H_2O}{OH^-}$ | 10–300 | 10–300 | 10–300 |
| $\dfrac{SiO_2}{Al_2O_3}$ | 5–100 | 10–60 | 10–40 |
| $\dfrac{Alcohol}{Al_2O_3}$ | 0–400 | 0–300 | 0–150 |
| $\dfrac{NH_4OH}{Al_2O_3}$ | 0–250 | 0–150 | 0–100 |

It should be noted that in Table C-1 the $OH^-$ in the $NH_4OH$ is not included in the two ratios including that ion.

Stated on a different basis the values given in Table C-1 are the same as those set out in Table C-2 below:

TABLE C-2

|  | Broad | Preferred | Particularly Preferred |
|---|---|---|---|
| $\dfrac{Na_2O}{SiO_2}$ | 0.035–0.5 | 005–0.4 | 0.1–0.375 |
| $\dfrac{H_2O}{Na_2O}$ | 20–600 | 20–600 | 20–600 |
| $\dfrac{SiO_2}{Al_2O_3}$ | 5–100 | 10–60 | 10–40 |

TABLE C-2-continued

|  | Broad | Preferred | Particularly Preferred |
|---|---|---|---|
| $\dfrac{\text{Alcohol}}{\text{Al}_2\text{O}_3}$ | 0–400 | 0–300 | 0–150 |
| $\dfrac{\text{NH}_4\text{OH}}{\text{Al}_2\text{O}_3}$ | 0–250 | 0–150 | 0–100 |

The reaction mixture can be prepared in either a batchwise or continuous manner. Crystal size and crystallization time will vary with the nature of the reaction mixture employed.

The ZSM-5 product prepared in accordance with the present invention will exhibit an X-ray powder diffraction pattern conforming to Table C-3:

TABLE C-3

| Interplanar Spacing d(A) | Relative Intensity |
|---|---|
| 11.1 ± 0.2 | S |
| 10.1 ± 0.2 | S |
| 7.4 ± 0.15 | W |
| 7.1 ± 0.15 | W |
| 6.3 ± 0.1 | W |
| 6.04 ⎱ ±0.1<br>5.97 ⎰ | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.03 | S |
| 2.99 ± 0.02 | W |
| 2.94 ± 0.02 | W |

Crystals of this invention having the topology of ZSM-11 are preferably made as the aluminosilicate utilizing reactants which supply the needed oxides. Thus, the reaction mixture may comprise reactants to yield an alkali metal oxide, e.g., sodium oxide, alumina and silica. The reaction mixture, which also comprises water and the reagents of the present improved method, will have a composition, in terms of mole ratios of oxides, as follows:

TABLE D

|  | Broad | Preferred |
|---|---|---|
| $\dfrac{\text{SiO}_2}{\text{Al}_2\text{O}_3}$ | 10–150 | 20–90 |
| $\dfrac{\text{Na}_2\text{O}}{\text{SiO}_2}$ | 0.05–0.70 | 005–0.40 |
| $\dfrac{\text{H}_2\text{O}}{\text{Na}_2\text{O}}$ | 50–800 | 100–600 |
| $\dfrac{\text{Alcohol}}{\text{Al}_2\text{O}_3}$ | 0–400 | 0–300 |
| $\dfrac{\text{NH}_4\text{OH}}{\text{Al}_2\text{O}_3}$ | 0–250 | 0–150 |

The porous crystals of this invention are useful in the same manner as those crystals of the same topology produced by prior art techniques, such as cracking, hydrocracking, M-forming, dewaxing, etc. The utility of these crystals has been found to be enhanced by removal of their alkali metal, e.g., sodium content prior to use. Conventional and known techniques, such as ion exchange are known to accomplish this.

With prior made crystals, however, the nitrogen or phosphorus containing organics contained in the pore system upon crystallization impede metal ion exchange and thus must be removed by calcination prior to effective metal ion exchange. Typical replacing cations would include hydrogen, ammonium and metal cations, including mixtures of the same. Of the replacing cations, particular preference is given to cations of hydrogen, ammonium, rare earth, magnesium, zinc, calcium, nickel, and mixtures thereof, generally employed in the form of their salts, preferably the chlorides, nitrates or sulfates.

Representative, more detailed ion exchange techniques are disclosed in a wide variety of patents, including U.S. Pat. Nos. 3,140,249, 3,140,251, 3,140,253 and 3,702,866.

Following contact with the salt solution of the desired replacing cation, the porous crystals prepared in accordance with this invention may be washed with water and dried at a temperature ranging from 150° F. to about 600° F., and thereafter may be heated in air or other inert gas at temperatures ranging from about 500° F. to 1500° F. for periods of time ranging from 1 to 48 hours or more. The products thus produced and treated are also useful as catalysts, for example, in cracking, hydrocracking, M-forming and dewaxing operations.

It is also possible to treat the porous crystals with steam at elevated temperature ranging from 800° F. to 1800° F. and preferably 1000° F. and 1500° F., if such is desired. The treatment may be accomplished in atmospheres consisting partially or entirely of steam.

A similar treatment can be accomplished at lower temperatures and elevated pressures, e.g., 350°-700° F. at 10 to about 200 atmospheres.

The porous siliceous crystals produced in the method of this invention may be used in a porous matrix. The crystals can be combined, dispersed or otherwise intimately admixed with a porous matrix in such proportions that the resulting product contains from 1% to 95% by weight, and preferably from 1 to 70% by weight of the crystal in the final composite.

The term "porous matrix" includes inorganic compositions with which the crystals can be combined, dispersed or otherwise intimately admixed wherein the matrix may be active or inactive. It is to be understood that the porosity of the compositions employed as a matrix can either be inherent in the particular material or it can be introduced by mechanical or chemical means. Inorganic compositions, especially those of a siliceous nature, are preferred. Of these materials inorganic oxides such as clay, chemically treated clay, alumina, silica, silica-alumina, etc. are particularly preferred because of their superior porosity, attrition resistance, and stability. More preferably, alumina is the matrix, and it is preferably combined with the siliceous prior to calcination.

Techniques for incorporating the porous crystals in a matrix are conventional in the art and are set forth for example in U.S. Pat. No. 3,140,253.

The instant invention offers a significant improvement over prior crystallization techniques in that, since it does not include nitrogen or phosphorus containing organics in the crystallization mixture, they are not present in the crystal pores and the as-crystallized product can be directly ion exchanged to remove alkali metal, e.g., sodium, cation without intervening calcination. Thus the process for producing a catalyst-ready porous siliceous crystal is remarkably simplified and improved.

The following Examples serve to illustrate the invention by preparing ZSM-5 crystalline aluminosilicates containing very low levels of organic nitrogen made by various techniques. It will be understood that the examples are not intended in any way to place a limitation on the invention.

A typical preparation of ZSM-5 according to the invention is given hereinbelow. The details and results for the product produced are listed in Example 1 of Table 1. An acid alumina solution containing 12.3 gms of $Al_2(SO_4)_3 \cdot 18H_2O$, 30.0 gms 98% $H_2SO_4$ and 600 gms of $H_2O$ was added to a sodium silicate solution made by mixing 360 gms of Q-Brand sodium silicate (28.8% $SiO_2$, 8.9% $Na_2O$, 62.4% $H_2O$) and 450 gms water. To the resultant gel was added 124 gms ethanol. The gel was mixed with the alcohol until homogeneous and crystallized at autogenous pressure in a stirred autoclave at 350° F. for 24 hours. The resultant solid material was water washed and dried at 230° F.

Examples 2-12 were made in a similar manner using the ingredients and conditions as shown in Tables 1-5.

Several of these examples were ion exchanged with ammonium salts without any prior calcination to show that sodium was easily replaced in such a procedure. Results were excellent as indicated in the appropriate tables.

TABLE 1

| | Ethanol | |
|---|---|---|
| Example | 1 | 2 |
| Mix Components, gms | | |
| A. Q Brand | 360 | 360 |
| H₂O | 450 | 450 |
| B. Al₂(SO₄)₃.18H₂O | 12.3 | 12.3 |
| H₂SO₄(98%) | 30.0 | 30.0 |
| H₂O | 600 | 600 |
| C. Ethanol | 124 | 124 |
| Mole Ratio of Mix | | |
| Ethanol | 146 | 146 |
| Na₂O | 8.6 | 8.6 |
| Al₂O₃ | 1.0 | 1.0 |
| SiO₂ | 94 | 94 |
| H₂O | 3870 | 3870 |
| Na₂SO₄ | 19.0 | 19.0 |
| Crystallization | Stirred | Stirred |
| Temp., °F. | 350 | 350 |
| Time, hrs. | 24 | 24 |
| Product | | |
| X-Ray Analysis | ZSM-5 | ZSM-5 |
| % Crystallinity | 90 | 135 |
| Composition, wt. % | | |
| N | 0.03 | <0.01 |
| Na | 1.2 | 1.0 |
| Al₂O₃ | 2.35 | 2.07 |
| SiO₂ | 94.5 | 93.8 |
| Composition, mole Ratio | | |
| N₂O | 0.05 | |
| Na₂O | 1.14 | 1.07 |
| Al₂O₃ | 1.0 | 1.0 |
| SiO₂ | 68.5 | 77.0 |
| Catalytic Properties | | |
| M-Forming Screening Test (600° F., 400 psig, 15 WHSV, 3/1 H₂/HC) (1.5 g catalyst - charged 50/50 wt n-heptane/benzene) | | |
| Type Catalyst | H⁺(1) | H⁺ |
| N-Heptane Catalyst Conv. wt. % | 65.4 | 68.2 |
| Benzene Conv. wt. % | 24.6 | 27.1 |
| C₇⁺ Aromatics Prod., wt. % | 21.4 | 23.2 |
| Selectivity | 0.28 | 0.28 |

(1)Pre-calcination, 1000° F. + NH₄ Exchange

TABLE 2

| | Ethanol and Seeds | |
|---|---|---|
| Example | 3 | 4 |
| Starting Compositions gms. | | |
| A. Q Brand | 45.0 | 360 |
| H₂O | 56.3 | 450 |
| B. Al₂(SO₄)₃.18H₂O | 1.54 | 12.3 |
| H₂SO₄(98%) | 3.75 | 30.0 |
| H₂O | 77.0 | 600 |
| C. Ethanol | 15.5 | 94.0 |
| D. ZSM-5 Seeds (19.3% Solids) | 3.25 | 26.0 |
| Mix Ratio - Moles | | |
| Ethanol | 111.0 | 111.0 |
| Na₂O | 8.6 | 8.6 |
| Na₂SO₄ | 19.0 | 19.0 |
| Al₂O₃ | 1.0 | 1.0 |
| SiO₂ | 94.0 | 94.0 |
| H₂O | 3870 | 3870 |
| Crystallization, Temp. °F. | 350 | 350 |
| Time, hrs. | 97 | 21 |
| Product | | |
| X-Ray Analysis | ZSM-5 | ZSM-5 |
| % Crystallinity | 90 | 90 |
| Composition, wt. % | | |
| N | 0.024 | 0.037 |
| Na | 1.50 | 1.20 |
| Al₂O₃ | 2.21 | 4.15 |
| SiO₂ | | 97.7 |
| Composition, Molar Ratio | | |
| Na₂O | 1.5 | 0.64 |
| Al₂O₃ | 1.0 | 1.0 |
| SiO₂ | | 40.0 |

TABLE 3

| | Seeds Only | |
|---|---|---|
| Example | 5 | 6 |
| Starting Components, gms | | |
| A. Q Brand | 45.0 | 450 |
| H₂O | 56.3 | 563 |
| B. Al₂(SO₄)₃.18H₂O | 1.54 | 15.4 |
| H₂SO₄(98%) | 3.75 | 37.5 |
| H₂O | 77.0 | 770 |
| C. ZSM-5 seeds (19.3% Solids) | 3.25 | 32.5 |
| Mixed Ratio - Moles | | |
| Na₂O | 8.6 | 8.6 |
| Na₂SO₄ | 19.0 | 19.0 |
| Al₂O₃ | 1.0 | 1.0 |
| SiO₂ | 94 | 94 |
| H₂O | 3870 | 3870 |
| ZSM-5, % Final Product | 5.7 | 5.7 |
| Crystallization | Static | Stirred |
| Temp., °F. | 350 | 350 |
| Time, hrs. | 96 | 24 |
| Product | | |
| X-Ray Analysis | ZSM-5 | ZSM-5 |
| % Crystallinity | 90 | 105 |
| Composition, wt. % | | |
| N | 0.02 | 0.03 |
| Na | 1.50(1) | 1.79(1) |
| Al₂O₃ | 2.40 | 2.44 |
| SiO₂ | | 97.2 |
| Composition, Molar Ratio | | |
| Na₂O | 1.38 | 1.63 |
| Al₂₃O₃ | 1.0 | 1.0 |
| SiO₂ | | 67.8 |
| Catalytic Properties | | |
| M-Forming Screening Test (600° F., 400 psig, 15 WHSV, 3/1 H₂/HC, 1.5 gms. cat.) | | |
| Type Catalyst | | H⁺(2) |
| n-heptane Conv., wt. % | | 89.6 |
| Benzene, Conv., wt. % | | 30.8 |
| C₇⁺ Aromatics Prod., wt. % | | 29.2 |

TABLE 3-continued

| | Seeds Only | |
|---|---|---|
| Example | 5 | 6 |
| Selectivity | | 0.31 |

(1)This value is reduced to 0.08% on Example 5 and (0.04% on Example 6 when exchanged with NH₄Cl without any precalcination
(2)Pre-calcination, 1000° F. + NH₄ exchange

TABLE 4

| Example | Ethanol + NH₄OH 7 |
|---|---|
| Mix Components, gms | |
| A. Q Brand | 362 |
| H₂O | 478 |
| B. Al₂(SO₄)₃·18H₂O | 13.1 |
| H₂SO₄(98%) | 31.9 |
| H₂O | 0.58 |
| C. Ethanol | 131 |
| NH₄OH, Conc., ml | 148 |
| Mole Ratio of Mix | |
| Ethanol | 146 |
| NH₄OH | 114 |
| Na₂O | 8.6 |
| Al₂O₃ | 1.0 |
| SiO₂ | 94.0 |
| H₂O | 3870 |
| Na₂SO₄ | 19.0 |
| Crystallization | Stirred |
| Temp., °F. | 350 |
| Time, hrs. | 21 |
| Product | |
| X-Ray Analysis | ZSM-5 |
| % Crystallinity | 110 |
| Composition, wt. % | |
| N | 0.044 |
| Na | 0.94 |
| Al₂O₃ | 2.41 |
| SiO₂ | 96.1 |
| Composition, mole Ratio | |
| N₂O | 0.07 |
| Na₂O | 0.87 |
| Al₂O₃ | 100 |
| SiO₂ | 67.8 |
| Catalytic Properties | |
| M-Forming Screening Test (600° F., 400 psig, 15 WHSV, 3/1 H₂/HC) (1.5 g catalyst - charged 50/50 wt n-heptane/benzene) | |
| Type Catalyst | H³⁰(1) |
| n-Heptane Conv., wt. % | 76.6 |
| Benzene Conv., wt. % | 26.4 |
| C₇⁺ Aromatics Prod., wt. % | 24.9 |
| Selectivity | 0.31 |

(1) NH₄ Exch., 210° F. without pre-calcination
Na = 0.01%

TABLE 5

| | Ethanol | | | | |
|---|---|---|---|---|---|
| Example | 8 | 9 | 10 | 11 | 12 |
| Mix Components, gms | | | | | |
| A. Q Brand | 360 | 45 | 45 | 255.2 | 45 |
| H₂O | 450 | 56.3 | 56.3 | 280 | 56.3 |
| Ludox (29.5% SiO₂) | 450 | 56.3 | 56.3 | 280 | 56.3 |
| B. Al₂(SO₄)₃·18H₂O | 12.42 | 1.54 | 1.54 | 20.0 | 2.25 |
| H₂O₄ | 30.0 | 3.75 | 3.75 | 20.0 | 2.25 |
| H₂O | 616 | 77.0 | 77.0 | 480 | 77.0 |
| C. Ethanol | 124 | 15.5 | 15.5 | 124 | 15.5 |
| NH₄OH conc., ml. | 140 | 17.5 | 17.5 | 140 | 17.5 |
| D. ZSM-5 seeds (19.3% solids) | 26.0 | 3.25 | 3.25 | 21.0 | 3.25 |
| Mole Ratio of Mix | | | | | |
| Ethanol | 73 | 73 | 146 | 90 | 336 |
| NH₄OH | 115 | 115 | 115 | 69 | 28.5 |
| Na₂O | 8.6 | 8.6 | 8.6 | 2.56 | 1.66 |
| Al₂O₃ | 1.0 | 1.0 | 1.0 | 1.0 | 1.0 |
| SiO₂ | 94.0 | 94.0 | 94.0 | 40.8 | 23.9 |
| H₂O | 3870 | 2870 | 3870 | 1700 | 990 |
| Na₂SO₄ | 19.0 | 19.0 | 19.0 | 9.7 | 5.4 |
| ZSM-5 Seeds, % Final Product | 5.7 | 5.7 | 5.7 | 5.5 | 5.4 |
| Crystallization | Stirred | Static | Static | Stirred | Static |
| Temp., °F. | 350 | 446 | 255 | 350 | 400 |
| Time, hrs. | 17 | 22 | 334 | 120 | 96 |
| Product | | | | | |
| X-Ray Analysis | ZSM-5 | ZSM-5 | ZSM-5 | ZSM-5 | ZSM-5 |
| % Crystallinity | 95 | 110 | 95 | 80 | 65 |
| Composition, wt. % | | | | | |
| N | 0.053 | 0.13 | 0.19 | 0.011 | 0.016 |
| C | 0.42 | | | | |
| Na | 1.3(1) | 0.98 | | 1.7(1) | 3.2 |
| Al₂O₃ | 2.53 | 2.13 | | 4.36 | 6.40 |
| SiO₂ | 97.2 | 95.6 | | 92.8 | 88.2 |
| Composition, mole Ratio | | | | | |
| N₂O | 0.08 | 0.24 | | 0.01 | |
| Na₂O | 1.14 | 1.02 | | 0.87 | |
| Al₂O₃ | 1.0 | 1.0 | | 1.00 | 1.0 |
| SiO₂ | 65.3 | 76.2 | | 36.1 | 23.4 |
| Catalytic Properties | | | | | |
| M-Forming Screening Test (600° F., 400 psig, 15 WHSV, 3/1 H₂/HC) (1.5 g catalyst - charged 50/50 wt n-heptane/Benzene) | | | | | |
| Type Catalyst | | H⁺(2) | | H⁺(2) | |
| n-Heptane Conv., wt. % | | 80.2 | | 95.0 | |
| Benzene Conv., Wt. % | | 32.0 | | 27.8 | |
| C₇⁺ Aromatics Prod., wt. % | | 28.9 | | 27.4 | |

TABLE 5-continued

| | Ethanol | | | | |
|---|---|---|---|---|---|
| Example | 8 | 9 | 10 | 11 | 12 |
| Selectivity | 0.32 | | 0.28 | | |

(1) These values are reduced to 0.03% for Example 8 and 0.05% for Example 11. When uncalcined samples are exchanged with NH₄Cl.
(2) Calcination 1000° F. + NH₄⁺ Exchange The following Examples illustrate the practice of this invention to produce as-crystallized porous siliceous crystals having the described topology by carefully controlling the crystallization mixture proportions and in the the absence of organics, nitrogen compounds or phosphorus compounds:

| Solution A | |
|---|---|
| Sodium aluminate (43.3% $Al_2O_3$, 32.2% $Na_2O$, 25.6% $H_2O$) | 15.3 g |
| 50% NaOH solution | 18.3 g |
| $H_2O$ | 1122 g |
| Solution B | 391 g |
| Colloidal Silica Sol (30% $SiO_2$, 70% $H_2O$) | |

Solution A was added to Solution B with vigorous stirring and thoroughly mixed. The reaction mixture had the following composition in mole ratios:

| | |
|---|---|
| $SiO_2/Al_2O_3$ = | 30.1 |
| $OH^-/SiO_2$ = | 0.20 |
| $H_2O/SiO_2$ = | 39.8 |

The mixture was crystallized in a stirred reactor at 175° C. for 3 days. The product was water washed and dried at 120° C. X-ray analysis of the product: ZSM-5, 65% crystallinity. Analysis of the product:

| Composition, wt. % | |
|---|---|
| Na | 2.5 |
| $Al_2O_3$ | 5.7 |
| $SiO_2$ | 82.2 |
| Ash | 94.0 |
| $SiO_2/Al_2O_3$ | 24.5 |
| $Na_2O/Al_2O_3$ | 0.97 |

A portion of the as synthesized material was calcined at 540° C. and submitted for adsorption and surface area.

| $M^2/gm$ | 232 |
|---|---|
| Cyclohexane, wt. % | 7.4 |
| n-Hexane | 11.0 |
| $H_2O$ | 9.3 |

EXAMPLE 14

Sodium aluminate, sodium hydroxide, colloidal silica (30%) and $H_2O$ were combined to give a reaction mixture with the following composition in mole ratios:

| | |
|---|---|
| $SiO_2/Al_2O_3$ = | 50.2 |
| $OH^-/SiO_2$ = | 0.2 |
| $H_2O/SiO_2$ = | 40 |

The mixture was crystallized in a stirred reactor at 175° C. After 48 hours, the product was ZSM-5, 75% crystalline.

The product after washing and then drying at 120° C. had the following composition:

| | |
|---|---|
| Na, wt. % | 1.8 |
| $Al_2O_3$ | 4.2 |
| $SiO_2$ | 84.7 |
| Ash | 95.0 |
| $SiO_2/Al_2O_3$ | 34.3 |
| $Na_2O/Al_2O_3$ | 0.95 |

EXAMPLE 15

56 g of product of Example 13 (as synthesized) was contacted with 10% NH₄Cl solution (20 cc solution/gm product) at 85° C. with stirring for 1 hour. This was repeated for a total of 5 contacts. The product was washed, dried and calcined at 500° C. The alpha value was 849.

EXAMPLE 16

56 g of product of Example 14 was treated with NH₄Cl as per Example 3. The alpha value was 556.

What is claimed is:

1. In the method of producing porous siliceous crystals having a topology which corresponds to an x-ray diffraction pattern having as its four (4) most significant lines 11.1±0.02, 10.0±0.02, 3.85±0.07, and 3.71±0.05, which process comprises forming an aqueous crystallization mixture having the composition:

$$OH^-/SiO_2 = 0.07-1.0$$

$$\frac{R_4N^+}{(R_4N^+ + Na)} = 0.2-0.95$$

$$\frac{H_2O}{OH^-} = 10-300$$

$$SiO_2/Al_2O_3 = 5-100$$

and maintaining such aqueous mixture under crystallization conditions of elevated temperatures for a time sufficient to cause said crystals to form; the improvement, whereby producing such crystals having in their as crystallized, uncalcined state substantially no nitrogen or phosphorus containing organic compound in the pores, which comprises providing said aqueous crystallization mixture composition having:

| | |
|---|---|
| $Na_2O/SiO_2$ = | 0.05-0.7 |
| $SiO_2/Al_2O_3$ = | 10-150 |
| $H_2O/Na_2O$ = | 50-800 | and having no nitrogen or phosphorus containing organic compound added thereto; and recovering the crystals so produced.

2. The improved process claimed in claim 1 wherein said crystallization mixture comprises:

| | |
|---|---|
| $Na_2O/SiO_2 =$ | 0.05–0.4 |
| $SiO_2/Al_2O_3 =$ | 30–50 |
| $H_2O/Na_2O =$ | 100–600 |

3. The improved process claimed in claim 1 wherein said crystallization mixture comprises:

| | |
|---|---|
| $Na_2O/SiO_2 =$ | 0.09 |
| $SiO_2/Al_2O_3 =$ | 94 |
| $H_2O/Na_2O =$ | 450 |

4. The uncalcined, as crystallized product produced by the process of claim 1.

* * * * *